United States Patent [19]
Paquette

[11] Patent Number: 5,389,209
[45] Date of Patent: Feb. 14, 1995

[54] PRODUCTION OF HIGH QUALITY MAPLE SYRUP

[76] Inventor: Yvon A. Paquette, 43 Reid, Drummondville, Quebec, Canada, J2B 7T5

[21] Appl. No.: 6,496

[22] Filed: Jan. 21, 1993

Related U.S. Application Data

[63] Continuation-in-part of Ser. No. 527,889, May 24, 1990, abandoned, which is a continuation-in-part of Ser. No. 355,490, May 23, 1989, abandoned.

[51] Int. Cl.⁶ .......................... B01D 1/16; B01D 3/00
[52] U.S. Cl. ......................................... 203/14; 127/34; 159/4.04; 159/16.1; 159/48.1; 159/901; 203/27; 203/49; 203/90; 203/98; 426/658
[58] Field of Search ............... 159/4.01, 48.1, 16.1, 159/901, 4.04, 37; 426/658, 475, 471; 127/34, 46.1; 203/49, 98, DIG. 8, 27, 14, 90

[56] References Cited

U.S. PATENT DOCUMENTS

| | | | |
|---|---|---|---|
| 29,647 | 5/1878 | Veltman et al. | 159/4.01 |
| 974,475 | 11/1910 | Daniels | 159/38 |
| 2,764,234 | 9/1956 | Rauh | 159/4.04 |
| 3,415,665 | 12/1968 | Hussmann | 159/4.04 |
| 3,519,054 | 7/1970 | Cavataio et al. | 159/4.04 |
| 3,522,151 | 7/1970 | Dismore | 159/4.01 |
| 3,615,701 | 10/1971 | Goss | 426/658 |
| 3,634,128 | 1/1972 | Bolin | 159/DIG. 27 |
| 3,771,151 | 11/1973 | Sipple et al. | 159/38 |
| 3,833,479 | 9/1974 | Fredriksson | 159/4.04 |
| 4,038,129 | 7/1977 | Wreszinski | 159/4.04 |
| 4,159,210 | 6/1979 | Chen et al. | 426/658 |
| 4,281,024 | 7/1981 | Hauberg et al. | 426/521 |
| 4,490,403 | 12/1984 | Pisecky et al. | 159/4.04 |
| 4,578,275 | 3/1986 | Spanier | 426/640 |
| 4,702,799 | 10/1987 | Tuot | 159/DIG. 28 |
| 4,796,602 | 1/1989 | Atkinson et al. | 159/32 |
| 4,819,615 | 4/1989 | Richardson et al. | 159/18 |
| 4,938,989 | 7/1990 | Steeves et al. | 426/658 |
| 4,953,538 | 9/1990 | Richardson et al. | 159/29 |
| 5,049,199 | 9/1991 | Capen | 159/26.2 |
| 5,209,821 | 5/1993 | Shaw et al. | 159/4.01 |

FOREIGN PATENT DOCUMENTS

| | | | |
|---|---|---|---|
| 0289116 | 4/1928 | United Kingdom | 159/4.04 |
| 0376288 | 6/1932 | United Kingdom | 159/4.04 |

*Primary Examiner*—Virginia Manoharan
*Attorney, Agent, or Firm*—ROBIC

[57] ABSTRACT

A process for making a light color maple syrup from a water-containing sap. In a first step, the sap is boiled under normal pressure to evaporate part of the water contained therein in the form of steam, to form the maple syrup and to develop caramelized and sweet characteristics and give flavor and a tinted color to this maple syrup. In a second step, the sap is heated at a temperature lower than the boiling temperature of the sap and atomized through an air circulating column to evaporate another part of the water contained therein. This second step which can be carried out before the first one, permits to concentrate the sap, to increase its sugar content and to avoid further caramelization thereof. The sap which is so obtained with an increased sugar content, may be recycled as long as necessary until a desired sugar concentration corresponding to a predetermined Brix number is reached.

34 Claims, 4 Drawing Sheets

PRODUCTION OF HIGH QUALITY MAPLE SYRUP

CROSS-REFERENCE

This is a continuation-in-part of U.S. patent application Ser. No. 07/527,889 filed on May 24, 1990, now abandoned, which is a continuation-in part of U.S. patent application Ser. No. 07/355,490 filed May 23, 1989, now abandoned.

FIELD OF THE INVENTION

The invention is directed to the production of high quality maple syrup and to processes and apparatuses therefor.

BACKGROUND OF THE INVENTION

The evaporation of sap in the production of maple syrup is usually made in horizontal pans provided with partitions and heated with wood logs. The vapor produced is usually lost in the atmosphere. Some attempts have been made to use the heat lost by the vapor which rises over the flat horizontal pans.

The Applicant has also been informed that water has been extracted from sap by a process called "reversed osmosis process".

SUMMARY OF THE INVENTION

The invention aims at reducing the color produced in making a maple syrup at the most preferred level, using specific steps and pieces of equipment to do so, while taking into account, in some special cases, other factors such has the nature of the sap, energy consideration, etc.

This is obtained by means of two essential steps: evaporation at the boiling temperature to develop color and taste, and evaporation at temperatures below the boiling point, preferably 200° F. and less, to remove excess water. Preferably, removal of the excess water is carried out first although with some sap, development of the color may be carried out first.

In this last instance, the invention aims at concentrating at lower temperatures a concentrate obtained from a horizontal pan of a sap evaporator, thereby improving the quality of the maple syrup, i.e. color and taste.

More particularly, the invention as broadly claimed hereinafter is directed to a process for making maple syrup from a sap containing water and sugar, comprising two steps that may be carried out in any order. The first step consists in boiling the sap under normal pressure to evaporate part of the water contained therein in the form of steam so as to poren maple syrup, to develop caramelized and sweet characteristics of said maple syrup and to give flavor and a tinted color to said maple syrup. The second step consists in processing the sap by heating the same at a temperature lower than 212° F. by means of a heating source; atomizing the heated sap in an air circulating column through which air is blown at low pressure to evaporate another given part of the water contained in the sap and thus produce humid air that is eliminated, and to concentrate the sap in order to increase its sugar content while avoiding caramelization thereof; recycling the concentrated sap that is so obtained toward the heating source and repeating the heating and atomizing steps as long as necessary to further concentrate said sap until its sugar content corresponds to a predetermined Brix number.

The invention is also directed to a process for making maple syrup from a sap containing water, comprising the following steps:

a) evaporating at least 50% by weight of the water contained the sap by atomization of said sap at a temperature below 212° F. in an air circulating column through which air is blown at low pressure and humid air is formed and eliminated; and b) thereafter, to develop caramelized and sweet characteristics and give flavor and a tinted color to the maple syrup, boiling the sap evaporated in step a) under atmospheric pressure.

The invention is further directed to a process for making maple syrup from a sap containing water, where at least 50% of the water contained in the sap is removed evaporation at a temperature below 212° under atmosphere pressure.

The invention is also directed to equipments that can be used to carry out the above processes.

DETAILED DESCRIPTION OF THE INVENTION

Figure 5:
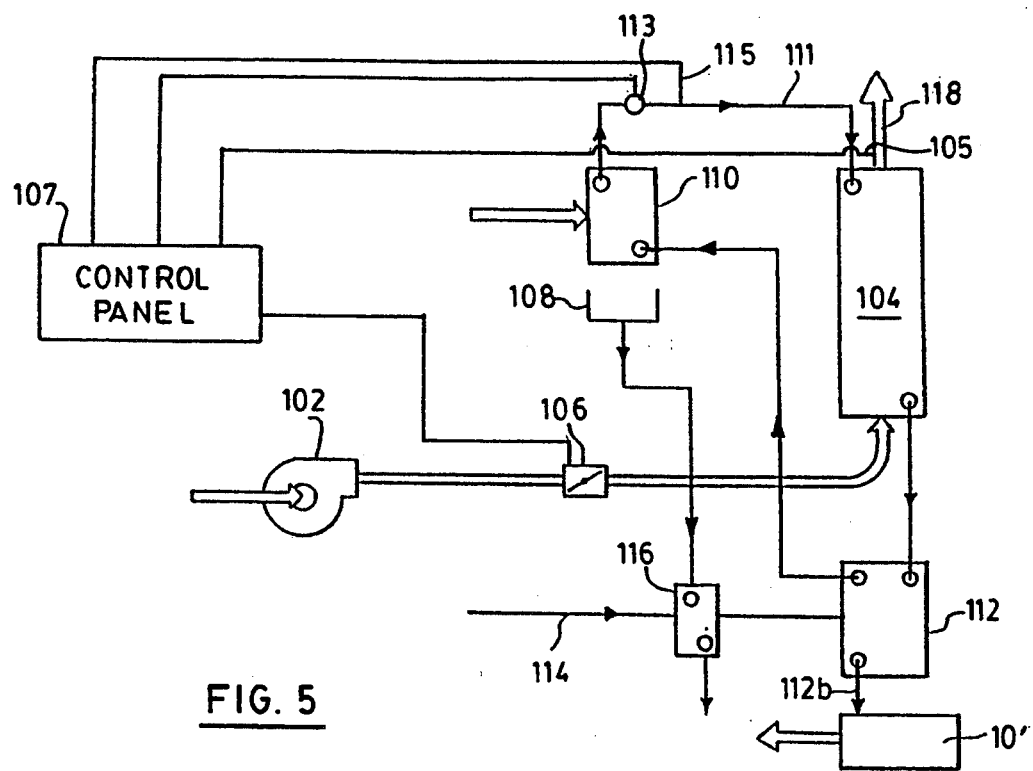
FIGS. 5 and 6 are two schematic representations of other systems for the production of maple syrup, showing more complex embodiments of the invention.
Figure 6:
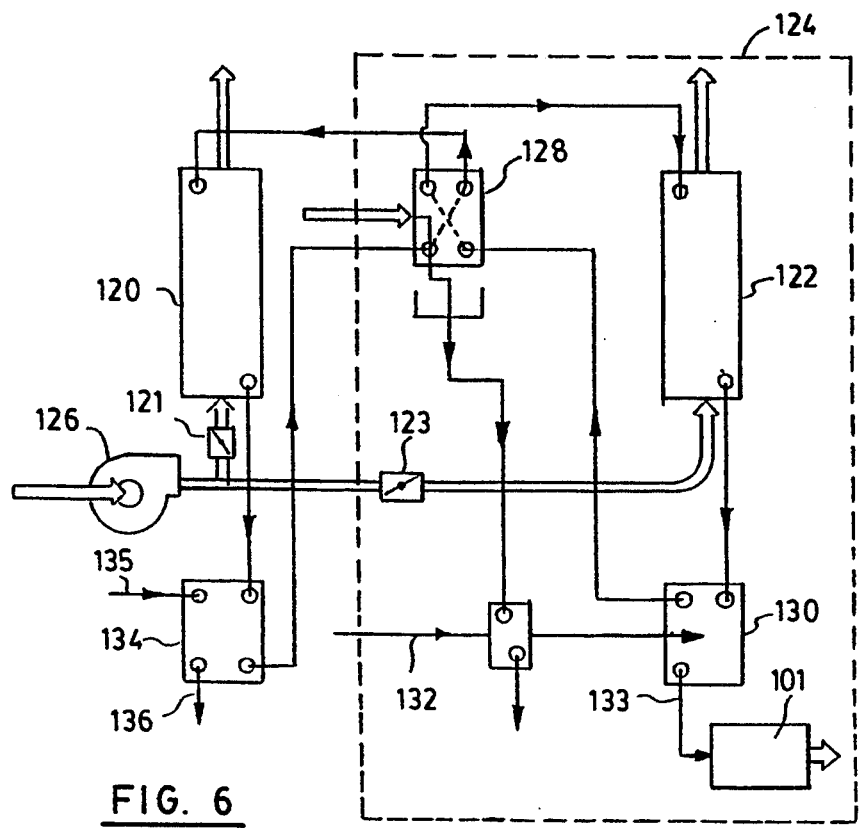

For the purpose of clarity, one of the simplest embodiments of the invention will be disclosed first, prior to dealing with the other, more complex embodiments shown in FIGS. 5 and 6.

Figure 1:
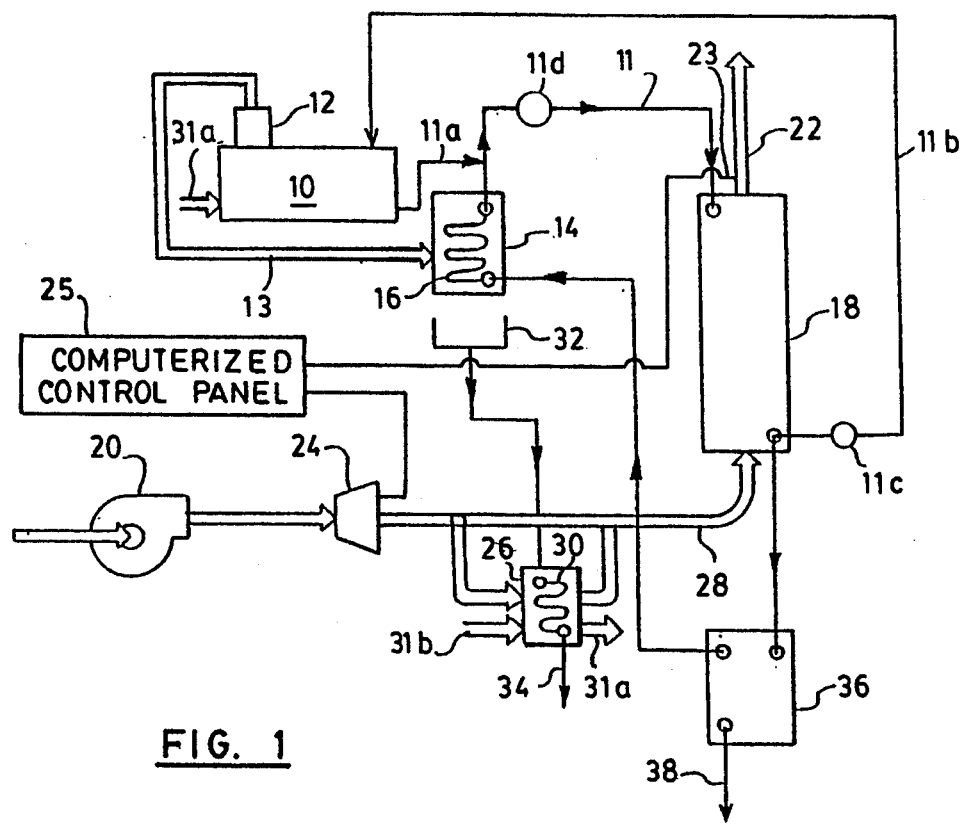
FIG. 1 is a schematic representation of a system for the production of maple syrup, showing a simple embodiment of the invention to help in understanding the invention.

The process according to the invention is broadly illustrated in FIG. 1. This process makes use of conventional sap evaporator 10. When heated, the evaporator 10 produces water vapor through a steam chimney 12, which is sent to a heat exchanger 14 via a line 13. The heated sap which comes out of the evaporator 10 is directed via lines 11a and 11 to a vertical air circulating column or tower 18, preferably working in counter-current, in which the sap is hot sprayed during its fall towards the bottom of the vertical toward 18 to flash out water contained in the sap. A ventilator 20 produces the necessary air flow which is directed towards the lower part of the air counter-current tower 18 and projected through the atomized or sprayed sap, i.e. through the droplets or mist of sap falling in the counter-current tower 18. As a matter of fact, the sap needs only to be placed into an air circulating current to be dried, but this is a more preferred embodiment. The upward flow of air has a very low pressure sufficient to pass through the droplets of sap and to remove water therefrom. The incoming flow of air is relatively dry and picks up humidity from the droplets of sap, thereby forming humid air that is eliminated when it reaches the venting outlet 22. The relative speed and temperature of the droplets of sap and of the air in the vertical tower 18 is such that the air reaching the venting outlet 22 reaches a humidity saturation of about 100%. If desired, the speed of the ventilator 20 and resulting flow of air in the column may be controlled at 24 so that humidity saturation of the air escaping through the venting outlet 22 be equal to or close to the requested 100%. Such a control can be achieved with a temperature or humidity sensor 23 connected to a computerized control panel 25 which is itself operatively connected to the control means 24 that may consist of a valve. Of course, instead of using a separate control means 24 as is shown in FIG. 1, control could be achieved by increasing or reducing the speed of the motor driving the ventilator 20. If desired, the air may be heated in a condenser 26, but preferably is not, before reaching the intake 28 of the air countercurrent tower 18.

It should be noted that the invention is directed to a system where flavor enhancement is obtained in the evaporator 10, and removal of water in the air circulating tower 18.

The condenser 26 consists of an enclosure through which a fluid (liquid or gas) to be heated by heat exchange flows. This fluid exchanges heat with the water condensate which is collected at about 212° F. in a collector 32 in the form of a tray located under the heat exchanger 14, and which flows into a coil 20 in the condenser. The condensate which is collected in the collector 32 is produced by condensation of the steam received from the chimney 12 which is cooled by heat exchange with a fluid passing through a tubular coil 16, or a set of plates or other radiating elements. The condensate, i.e. water having a temperature of about 212° F., flows freely from the collector 32 through the coil 30 of the condenser 26 and is expelled through an exit 34 at a temperature as low as ambient temperature.

A collector or reservoir 36 is disposed at the end of the counter-current tower 18 to receive the concentrated sap from the counter-current tower 18, which may be recovered at 38 or recirculated as "fluid" through the coil 16 of the heat exchanger 14 so as to be heated, prior to being recycled to the counter-current tower 18 via the line 11 in order to be sprayed again for further concentration of the sap. The sap recovered from the collector 36 can be either returned to the tower 18 in the manner explained above, or collected at the desired concentration through the line 38.

By way of example, the sap may be heated in the evaporator 10 and the water contained therein allowed to evaporate until a Brix number of 25±15 is reached. Heating is conducted so that the sap is at a temperature in excess of 212° F., for instance in the 212°-219° F. range, in order for the sap to develop a caramelized color and taste that will give the maple taste to the resulting syrup. The sap is then allowed to proceed via the recycling stage line 11, the air circulating column 18, the collector 16, and the heat exchanger 14, until the sap reaches another desired Brix number. Such a recycling enables removal of the excess water without darkening the sap.

Fresh sap fed through lines 31b and 31a may also be heated in the condenser 26 as is the air supply, before treatment in the evaporator 10, as will be discussed hereinbelow.

It is essential to have both the sap evaporator and the recycling system, or to have a recycling system added to an existing evaporator because if the recycling system is only used, the maple syrup obtained is rather white and has not a good maple flavor.

In this way, on recycling, the temperature of the sap may be brought to only 80° to 90° F.

In its simple form as shown in FIG. 1, the recycling system comprises a sap evaporator 10 connected to a column 18 via the lines 11a and 11 and a return line 11b provided with circulating means for supplying the sap from the evaporator 10 to the column 18 and second circulating means for supplying said sap from an outlet of the column 18 to the sap evaporator 10. The first circulating means may consist of a pump 11d or may be achieved by gravity while the second means may consist of a pump 11c or gravity.

Figure 2:
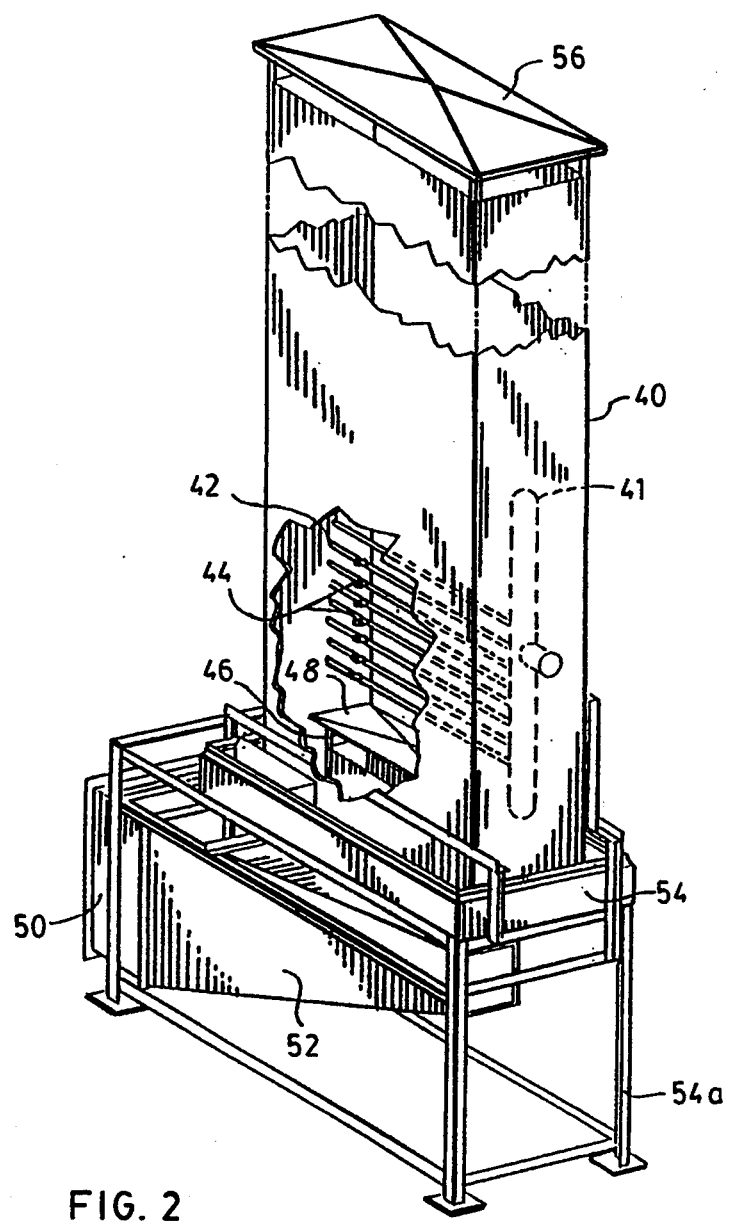
FIGS. 2 and 3 are perspective views of a vertical housing for concentrating sap.

An example of column is illustrated in FIG. 2. It comprises a vertical housing 40 containing a continuous piping system 41, 42 receiving the sap via line 11 from the sap evaporator 10 or heat exchanger 14 (FIG. 1). The piping system 41–42 is provided with atomizing or spraying means such as a plurality of sprayer nozzles 44 adapted to spray sap throughout the vertical housing 40. The opening 48 of the intake of the air flow has a cover 48 to protect it and prevent the sap from entering the intake. The air from the ventilator may pass through a radiator or heat exchanger 50 and though an air duct 52 before it reaches the air intake opening 46. A tray 54 mounted at the bottom of the housing 40 is adapted to collect the sap in a partially concentrated or concentrated condition. This tray 54 is part of the collector 36 shown in FIG. 1. A roof 56 covers the housing 40 and is spaced from it to allow the humid air to flow out of the housing 40.

If desired, the tray 54 is preferably mounted on a supporting frame 54a with long legs, to enable the sap to flow by gravity from tray 54 to the sap evaporator 10 and, to that extent, to further reduce energy consumption.

A venting system such as louvers, which acts to remove the sugar droplets forming a mist, also known as a demister, is disposed below the roof 56 to control the exit of the humid air. Other demistering means may be used such as a tortuous path, an expansion path, a filtering path. The housing 40 operates at its maximum efficiency when the humidity of the air coming out at the top of the housing is 100%. A temperature gradient of about 3°-5° F. and preferably 4°-5° F. is generally established between the sap as it reaches tray 54 and the air leaving through the vents.

Figure 3:
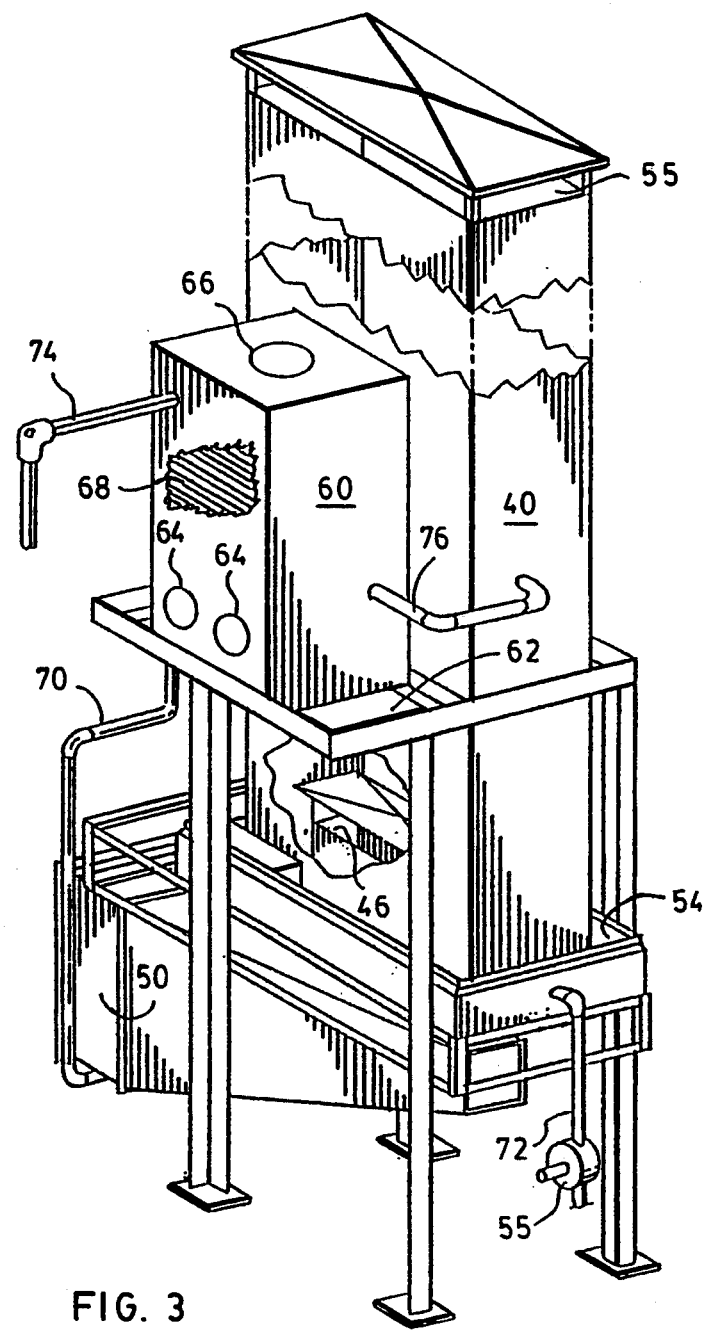

FIG. 3 illustrates an installation similar to the one shown in FIG. 2 including a heat exchanger 60 corresponding to the heat exchanger 14 shown in FIG. 1 and a tray 62 corresponding to the tray 32 for the condensate, shown in FIG. 1. The steam or vapor coming from the evaporator 10 enters the heat exchanger 60 through steam inlets 64, and leaves air through the exhaust hole 66 after having passed through a winding tube 68. The steam condenses into hot water during its passage in the heat exchanger 60 and falls in the tray 62 to produce a condensate which is directed through a tube 70 towards a heat exchanger such as 50. The tray 62 may be provided with tubular plate or other radiating elements used in heat-exchangers, as will be discussed hereinafter.

The condensate that consists of hot water in the vicinity of 212° F. is used, as explained in FIG. 1, for heating fresh sap as is illustrated at 31b and will be discussed hereinunder or for heating air coming from the ventilator 20 and directing it towards the air inlet 46 of the column and then through the housing 40. The sap which has been partially concentrated in the housing 40 and which has reached the tray 54 is pumped by a pump 55 towards the heat exchanger 60 through the tubes 72 and 74. The partially concentrated sap which has reached the tube 74 at a temperature of about 130° F., passes through the winding coil 68 to be reheated by the steam passing through the heat exchanger 60. The sap coming out of the heat exchanger 60, through the tube 76, reaches a temperature in the vicinity of 200° F., for instance. The sap leaving the tube 76 is redirected towards a spreading channel 41 (FIG. 2) which directs the partially concentrated sap towards the feeding lines 42 and nozzles 44. The temperature of the sap downwardly flowing through the housing 40 and the temperature and the speed of the air upwardly flowing through it, can be taken into account to maintain complete water saturation of the air leaving through the vents 55. Such can be achieved by the sensor 23, computerized control panel 25 and air control means 24 as was explained hereinabove. The air pressure coming from the air intake 46 is maintained at a relatively low level and usually at a pressure of less than 2 inches of water.

As shown in FIG. 1, one may also add new partially concentrated sap into the condenser 14 via the line 11a for maintaining a continuous circulation of sap through the system though less preferred. The system may also receive from line 31b, fresh sap to be heated through heat exchanger 26 and fed into the evaporator 10 via line 31A.

The maple syrup, when it has reached the desired concentration, is removed from the collecting means: for instance the collector or reservoir 36 (FIG. 1) or the tray 54 (FIGS. 2, 3). If desired, the fully concentrated sap may also be returned to the evaporator as explained later.

Figure 4:
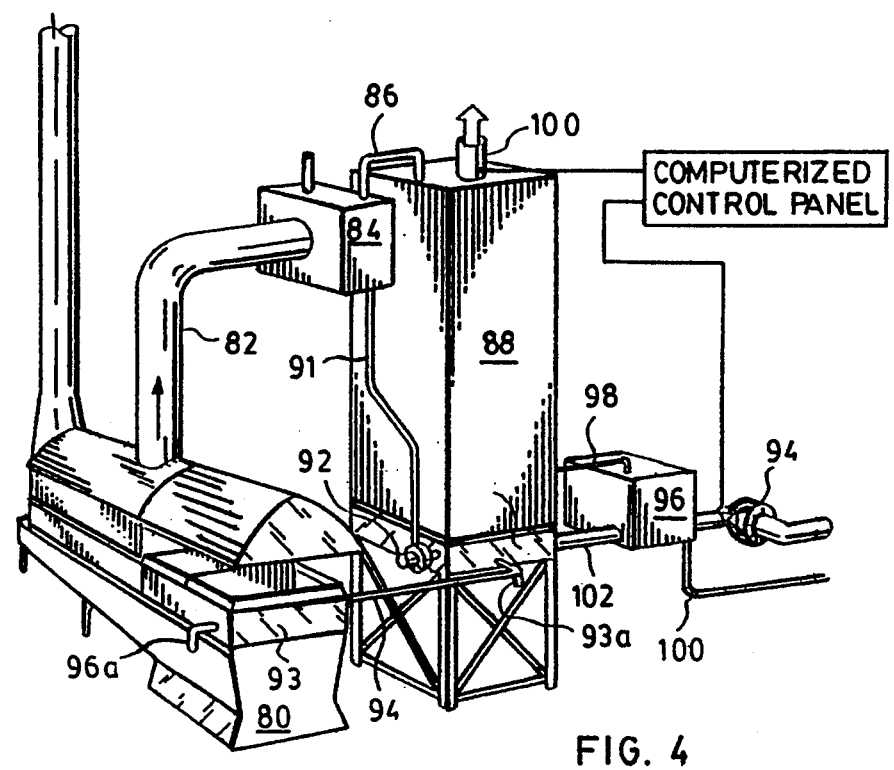
FIG. 4 is a perspective view of an evaporator for producing maple syrup according to the process represented in FIG. 1.

FIG. 4 shows another embodiment of the invention in combination with a conventional evaporator 80. The steam which is produced by the evaporator and rejected through the chimney 82, instead of being wasted in the atmosphere is directed towards a heat exchanger which is also a condenser 84. The sap going through the coil of the heat exchanger 84 is directed through a tube 86 into a vertical air circulation column 88 similar to the one previously disclosed, collected by a tray 90 and returned to the heat exchanger 84 by a circulating pump 92 and a line 91. The condensate obtained in the heat exchanger 84 is directed to a second heat exchanger 96 as a hot liquid and expelled therefrom through a tube 100 as a cool liquid. A fluid such as air from the ventilator (or pump) 94 is projected at surrounding temperature into the air exchanger 96 and fed as hot air through a tube 102 leading to the vertical column 88. Then, hot air is blown through the sprayed sap as explained above. More preferably, instead of heating air, fresh sap can be introduced through a line similar to line 102 but which would deliver the fresh sap to evaporator 80 through a line 94. The sap, which has reached a satisfactory high degree of concentration in the tray 90 is immediately collected at 93a or, if desired, directed to a terminal tray 93 of the evaporator 80 through a conducting line 94 and collected through a tap 96a.

In this embodiment, the vapor which reaches the condenser 84 from the chimney 82 may be at about 212° F. The sap which enters the heat exchanger or condenser 84 at about 120° F. and leaves the condenser at about 195° F. before it enters the vertical column 88. The condensate which is formed within the condenser 84 passes through the heat exchanger 96 and warm up the air to a temperature of about 105° F., and the cold sap to a temperature up to ambient temperature for instance.

Once again, a computerized control panel may be operatively connected to a temperature or humidity sensor on top of the column 88 and to the ventilator 94 to adjust the flow of air within the column and make it sure that the air leaving the column is saturated with water.

The use of the vapor from the chimney 82 of the evaporator of the sap and of the condensate from the condenser such as 84, permits to save energy while the use of a vertical column such as 18 permits to produce a higher quality maple syrup particularly due to the fact that the sap and the partially concentrated sap are not exposed to high temperatures for long periods of time. High temperatures over extended periods of time cause the maple syrup to be dark while clear maple syrup is considered to be of a higher quality. Yet the evaporator is needed to caramelize the sap to a good syrup.

The procedure for saving energy can be modified while maintaining the above-described process and all its essential steps. In FIG. 5, which is one of the most preferred embodiment of the invention, the air from the ventilator 102 is not heated before it reaches the bottom of the vertical column 104. Once again, the speed of the air flow can be controlled by a flow controlling device 106 which can itself be controlled by a computerized control panel 107 connected to a humidity or temperature sensor 105 mounted on top of the column 104.

The system as described in FIG. 5 is substantially similar to the one described in FIG. 1 except that the evaporator is fed by a tray 112 located below the vertical housing 104. This tray 112 is constantly fed by an inflow of fresh sap from a conduit 114. Before entering the tray 112, the fresh sap is preheated in a heat exchanger 116 which receives the hot water condensate 108 of a heat exchanger 110 used to heat the sap fed into the column via a line 111 and pump 113.

As aforesaid, one of the main differences with the process described in FIG. 1, is that the air from the ventilator 102 is not heated before entering the vertical column 104. This modification affects the temperature of the air reaching the venting system 118. This process may be preferred depending on the quantity of water which needs to be extracted from the sap, as cool air is less humid and collects more water from the droplets. The outlet 112b may then be used to deliver the sap to an evaporator such as 10' when for instance a Brix number of 20±10 is reached, in order to obtain "caramelization" of the sap collected at 112b.

Advantageously, the pump 113 (or a set of flow valves heated down stream the pump if this pump is operating at constant pressure) may be controlled by the computerized control panel 107 as a function of the temperature of the concentrated sap fed from the heat exchanger 110 or from the evaporator 10' into the column 104, such a temperature being measured by a sensor 115 mounted on the line 111. The hotter the concentrater sap, the higher should be the speed of circulation of the sap within the line 111 and the higher should also be the air flow within the column 104 to continue to achieve maximum saturation.

One of the most preferred embodiments of the invention is schematically illustrated in FIG. 6. The process makes use of two vertical air columns 120 and 122. The part of the equipment surrounded by the dotted line 124 corresponds essentially to the one described in FIG. 5. However, the ventilator 126 projects and upward flow of air through both vertical column 120 and 122 while the speed of the air is controlled through flow control devices 121 and 123 respectively that are themselves controlled by a computerized control panel (not shown) and a set of sensors (not shown) mounted on top of the columns, as was explained above. The condenser 128 has a double winding coil to supply both vertical columns 120 and 122. The partially concentrated sap, leaving line 133 is returned to an evaporator 10'.

In a preferred embodiment, up to about 40% of the original water is removed before reaching the evaporator. At this point, the sap may have a Brix number of about 7, for example, whereas the sap in the feed line 132 has a Brix number of about 4. The Brix number is well known to those skilled in the art and defines the sugar concentration. A tray 130 is constantly fed by the feed line 132. The partially concentrated sap supplied to the condenser 128 from the collecting tray 134 of the column 120 is heated, while passing through the double condenser 128 and further concentrated through the vertical housing 120 before returning to the tray 134 where fully concentrated maple syrup will be picked up through line 136 at about a Brix number of 66. This is one of the best ways to obtain the desired syrup. Other Brix numbers may be selected if desired.

In another particular embodiment, the line 135 may be use to feed in the tray 134 a sap having a Brix number of 45. These numbers are given for example only and may vary widely according to the conditions, the system and the nature of the sap. It is pointed out that the tray 134 may also be constantly fed through the line 135 and may also be heated to increase its efficiency in a similar manner as tray 130.

According to a preferred embodiment of the present invention, the vertical housing of the column may have a rectangular horizontal cross-section of about 50 inches by 25 inches and about 165 inches high. The nozzles 44 are disposed in vertical columns mounted on a plurality of horizontally superposed pipes 42 projecting 45 gallons of sap per minute. The pipes 42 are spaced by about 4 to 6 inches and are spread over a height of about 52 inches. The temperature of the sap and of the surrounding air, the speed of the out flow and additional other factors, if desired, may be taken into account by the computerized control panel acting on the ventilator and/or pumps so that the humidity of the air leaving the top of the vertical housing is about 100%. It should be reminded that the quantity of water that can be contained in the exhausted substantially varies with the temperature of the latter. Air at a temperature of about $140° F. \pm 2° F.$ may contain 2.2 times more water than the same quantity of air at 115° F.

The flow air is accordingly computed in relation with the mass of water which needs to be absorbed and the available heat from the condensate. The air pressure needed to maintain an acceptable flow of air through the liquid droplets in the vertical housing is usually less than half an inch of water.

If one wishes to heat air, the heat exchanger 60 shown in FIG. 3 may consist of a continuous tubular winding 68 disposed in a horizontal fashion throughout an enclosure. The heat exchanger 26 of FIG. 1, may be made with a pair of car radiators connected in series, through which the condensate is flowing. For a flow of 170 gallons per hour of condensate entering at 200° F. the heat exchanger, the temperature of the condensate at the exit was 75° F. Such an arrangement could use a maximum flow of air of 600 feet per minute. However, ambient air and even outside air is generally better.

By way of example, the maple sap fed through the air circulating column may be at about 180°–200° F. and at the end of the column at about 136°5° F.

The difference in the humid air at the top of the air circulating column and the sap collected at the bottom may be about 3°–5° F. and preferably 4°–5° F. more at the top.

This system according to the invention allows a heat loss capacity of 20 to −25%. Another system that is so energy efficient is not known to the Applicant.

In the most preferred embodiment, it has been found that the sap should first be evaporated at lower temperatures than those normally encountered in the conventional horizontal pans, and then the concentrated sap may be finished in such a conventional pan. This evaporation is preferably conducted between about 140°–200° F. without experiencing substantial darkening and strong tastes as far as the desired Brix number intended. For maple syrup, this number is generally 66.

In any case, a temperature below 212° F. should preferably be used for evaporating the sap first until the sap reaches a Brix number at at least 14.

TENTATIVE EXPLANATION

As a tentative explanation only, to which the invention should not be restricted, it would appear that for a range, lets say between 180° and 219° F., the higher the temperature during evaporation of the sap, the darker will be the syrup; that relation seems to have an S-shaped curve, where the rate of darkening (D) with respect to temperature (T) dD/dT decreases as one approaches 219° or 180° F., so that between 160°–180° F., much less perceptible changes are noted and in the 219° F. vicinity, the product becomes so dark that additional dT is less relevant.

So, some kind of transition point appears to exist below about 219° F. This value varies somewhat with the nature of the sap, also if the collect is early or late in the season, if the trees are healthy or affected by acid rains. We are in the presence of a very complex chemical system which is a tree adapting to its environment.

The evaporation can be conducted in a gas counter-current tower as described above or by other running gas current entraining the water. Though less preferred, the evaporation at such temperatures could also be used by lowering the pressure at which evaporation is conducted.

The following examples will serve only to illustrate particular embodiments of the invention, and must not be used to limit the invention.

EXAMPLE 1

Sap is evaporated at 160° F. until a Brix number of 65 is reached, then boiled 3–4 minutes in a conventional horizontal pan. A precipitate is filtered, the filtered sap yielding a good maple syrup.

EXAMPLE 2

Sap is evaporated at 180° F. until a Brix number of 45 is reached, then boiled and filtered as in Example 1.

EXAMPLE 3

Sap is evaporated at 180° F. until a Brix number of 66 is reached. A precipitate is formed and removed, with egg-milk at 212°–213° F. and then cooked.

EXAMPLE 4

A sap of the same nature as in Examples 1–3 is evaporated to a Brix number of 7, then boiled as in Example 1 at 219° F., yielding a syrup that is dark and strong in taste.

EXAMPLE 5

A sap is boiled to a Brix number of 7 to caramelize, then evaporated, producing a syrup which is difficult to filter.

It should be noted that clarification can normally be obtained with bones powder, white eggs-milk, powdered milk.

Modification of the description of this invention will be evident to those skilled in the art without deporting from the spirit of the invention as defined in the appended claims that follow.

What is claimed is:

1. A process for making maple syrup from a sap containing water and sugar, said process comprising the following steps carried out in any order:
   a) boiling the sap under normal pressure to evaporate one part of the water contained therein in the form of steam, to form said maple syrup sugar and to develop caramelized and sweet characterics while simultaneously giving flavor and color to said maple syrup; and
   b) processing the sap as follows:
   heating the sap at a temperature lower than 212° F. by means of a heating source;
   atomizing the sap that is so heated in an air circulating column through which air is blown, so as to evaporate another part of the water contained in said sap and thus produce humid air that is eliminated, and to concentrate said sap in order to increase its sugar content while avoiding caramelization thereof;
   recycling the concentrated sap that is so obtained toward the heating source; and
   repeating said heating and atomizing steps to further concentrate said sap until its sugar content corresponds to a predetermined Brix number.

2. The process as defined in claim 1, wherein in step b), the sap atomized in the air circulating column is moving downwardly by gravity through an upward flow of air in a counter-current fashion.

3. The process as defined in claim 2, wherein the air fed into the air circulating column in step b) is outside air.

4. The process as defined in claim 2, wherein the difference in temperature between the humid air at the top of the column and the temperature of the sap at the bottom of the column is from 3° to 5° F.

5. The process as defined in claim 2, wherein the difference between the temperature of the humid air at the top of the column and the temperature of the sap at the bottom of the column is from 4° to 5° F.

6. The process as defined in claim 1, wherein in step a), the sap is boiled at a temperature of from 212° to 219° F.

7. The process according to claim 1, wherein step b) is carried out first until a Brix number of 61±5 is obtained, and then step a) is carried out.

8. The process as defined in claim 1, wherein step b) is carried out first until up to about 40% of the water content is removed and then step a) is carried out.

9. The process as defined in claim 1, wherein in step b), said heating is obtained by transferring heat from said steam produced in step a) through a heat exchanger.

10. The process as defined in claim 9, wherein said heat exchanger is a tubular heat exchanger.

11. The process as defined in claim 9, wherein the steam is converted into a condensate in said heat exchanger and said condensate is fed to another heat exchanger.

12. The process as defined in claim 11, wherein said another heat exchanger is used to heat the sap.

13. The process as defined in claim 1, wherein in step b), said heating is obtained by transferring heat from said steam produced in step a) through a heat exchanger, converting the steam into a condensate within said heat exchanger and feeding said condensate through another heat exchanger, said another heat exchanger being used to heat fresh sap, the fresh sap that is so heated being sent to said heat exchanger heated by said steam.

14. The process as defined in claim 13, wherein in step b), the sap is heated to about 80°–90° F.

15. The process as defined in claim 13, wherein said steam is at ambient pressure.

16. The process as defined in claim 1, wherein in step b), said heating source is the steam produced in step a).

17. The process as defined in claim 1, wherein the air blown into the air circulating column in step b) is at ambient temperature.

18. The process as defined in claim 1, wherein the temperature of said humid air produced in step b) is 135° F.±20° F.

19. The process as defined in claim 1, wherein the sap atomized in step b) into said air circulating column is at a temperature of 180° to 210° F., and the sap that is collected at the bottom of said air circulating column is at a temperature of about 136°±5° F.

20. The process as defined in claim 1, wherein step b) is repeated until a Brix number of 66 is obtained.

21. The process as defined in claim 1, wherein the temperature of said humid air produced in step b) is of 140° F.±5° F.

22. The process as defined in claim 1, wherein after each processing, the sap is collected in a reservoir and before repeating the processing, the sap from the reservoir is reheated.

23. The process as defined in claim 1, wherein in step b), said sap is atomized in a form of droplets.

24. A process for making maple syrup from a sap containing water, comprising the following steps:
   a) evaporating at least 50% by weight of the water contained in said sap by atomization of said sap at a temperature below 212° F. in an air circulating column through which air is blown at low pressure and humid air is formed and eliminated; and
   b) thereafter developing carmelized and sweet characteristics and flavor and a tinted color to the maple syrup by boiling the sap evaporated in step a) under atmospheric pressure.

25. The process as defined in claim 24, wherein said evaporation in step a) is conducted at a temperature of from 140° F. to 200° F.

26. The process as defined in claim 24, wherein in step a), said evaporation is conducted by circulating said sap in atomized form in counter-current through an airflow.

27. The process as defined in claim 24, wherein in step a), said evaporation is conducted until a Brix number of 66 is reached.

28. The process as defined in claim 24, wherein in step a), said evaporation is conducted at a temperature of from 140° to 200° F. until a Brix number of at least 45 is obtained.

29. The process as defined in claim 24, wherein in step a), the sap is evaporated at a temperature of from 160° F. to 180° F. until a Brix number of about 66 is reached.

30. The process as defined in claim 29, wherein after step b), said sap is caramelized and then decanted to remove a precipitate.

31. The process as defined in claim 29, wherein after being caramelized, the sap is filtered.

32. The process as defined in claim 24, wherein in step a), the sap is evaporated at a temperature not exceeding 180° F. until it reaches a Brix number ranging from 64 to 66.

33. The process as defined in claim 24, wherein after being caramelized, the sap is filtered.

34. The process as defined in claim 24, wherein step b) is conducted in a pan.

* * * * *